(12) United States Patent
Sherez

(10) Patent No.: US 6,450,869 B1
(45) Date of Patent: Sep. 17, 2002

(54) HAND HELD CUTTING TOOL AND ATTACHMENT THEREFOR

(75) Inventor: Shaul Sherez, Tel Aviv (IL)

(73) Assignee: Naki Technologies Ltd., Tel Aviv (IL)

( * ) Notice: Subject to any disclaimer, the term of this patent is extended or adjusted under 35 U.S.C. 154(b) by 0 days.

(21) Appl. No.: 09/601,824

(22) PCT Filed: May 16, 1999

(86) PCT No.: PCT/IL99/00259

§ 371 (c)(1),
(2), (4) Date: Aug. 7, 2000

(87) PCT Pub. No.: WO00/05032

PCT Pub. Date: Feb. 3, 2000

(30) Foreign Application Priority Data

Jul. 23, 1998 (IL) .................................................. 125469

(51) Int. Cl.⁷ .............................................. B24B 55/02
(52) U.S. Cl. ....................................... 451/449; 451/451
(58) Field of Search ............................... 451/449, 450, 451/451, 442, 344, 488, 455

(56) References Cited

U.S. PATENT DOCUMENTS

| | | | | |
|---|---|---|---|---|
| 3,896,783 A | * | 7/1975 | Manning | ................... 125/13 R |
| 4,251,109 A | | 2/1981 | Roepke | |
| 4,352,241 A | * | 10/1982 | Johansson | ................... 30/123.4 |
| 4,484,417 A | * | 11/1984 | Klingerman | ................. 51/267 |
| 4,782,591 A | * | 11/1988 | DeVito et al. | ............. 30/123.3 |
| 4,854,393 A | | 8/1989 | Palet | |
| 5,582,541 A | * | 12/1996 | Hutchins | .................... 451/357 |
| 5,622,056 A | | 4/1997 | Utter | |
| 5,826,478 A | * | 10/1998 | Zerrer | ........................ 30/123.3 |

FOREIGN PATENT DOCUMENTS

| | | |
|---|---|---|
| AT | 8801097 | 6/1989 |
| DE | 6913714 | 8/1969 |
| DE | 3730693 | 3/1989 |
| DE | 3838567 | 6/1989 |
| DE | 9404128 | 6/1994 |
| EP | 0036516 | 9/1981 |
| EP | 0235319 | 9/1987 |
| EP | 0332328 | 9/1989 |
| EP | 0845318 | 6/1998 |
| GB | 1473267 | 5/1977 |
| GB | 2060442 | 5/1981 |
| GB | 2135715 | 9/1984 |
| SU | 1214918 | 2/1986 |
| SU | 1346822 | 10/1987 |
| WO | 9611748 | 4/1996 |
| WO | 9741990 | 11/1997 |

* cited by examiner

Primary Examiner—Timothy V. Eley
Assistant Examiner—Dung Van Nguyen
(74) Attorney, Agent, or Firm—Seyfarth Shaw

(57) ABSTRACT

An attachment for a hand cutting tool having at least one rotating blade, the attachment including a portable device attachable to the hand cutting tool for producing a fog-like spray of water droplets near the rotating blade for moistening dust particles generated during cutting, and a hand tool including such an attachment. Preferably, the attachment includes a blade guard arranged to partially cover the rotating blade, a portable source of pressurized water which can be carried on the body of a user holding the cutting tool, and at least one nozzle mounted in the blade guard and coupled to the source of pressurized water for producing a fog-like spray of water droplets.

9 Claims, 6 Drawing Sheets ical box
HAND HELD CUTTING TOOL AND ATTACHMENT THEREFOR

FIELD OF THE INVENTION

The present invention relates to hand held cutting tools in general and, in particular, to a hand held groove cutter and angle grinder with portable dust reducing apparatus.

BACKGROUND OF THE INVENTION

Cutting tools including a rotating disc or saw have long been known. In many applications, it is desirable to reduce the heat of the disc during cutting to prolong the life of the blade. This has been accomplished, in a number of patents, by providing a flow of cooling water onto the cutting blade. For example, such an arrangement is provided for a rotary coal cutting head in AT8801097, EP 235319, and for a mining pick in GB 2135715.

Cutting with many of these tools is problematic due to the dust generated by the cutting. This dust dirties the work area, can make it difficult to see the area being cut, and is often dangerous to breathe. Even the use of a mask is generally not sufficient to prevent the inhalation of dust. However, a flow of cooling water wets the working area, making cutting difficult, so it is not suitable for reducing the quantity of dust.

The problem of dust is particularly serious in mining. A number of machines have been suggested for entrapping dust for use inside mines. These are generally large machines with a water supply provided to spray nozzles which spray water on the coal cutting head to suppress dust. See, for example, GB 1473267, U.S. Pat. No. 4,251,109, U.S. Pat. No. 1,214,918, U.S. Pat. No. 1,346,822, and DE 3838567. These devices require a large reservoir of water, heavy pumps to provide the water to the mining area, and definitely are not portable.

There is also described in WO97/41990 a dust suppressing hood for a rotary cutting disc. The hood includes a semi-circular casing, with multiple water spray nozzles fixed to the internal side faces of the hood and directed at one or both sides of the disc or saw. The dust combines with the water to form a pasty mass which falls from the hood. This device is complex and expensive to manufacture, and does not work well. This device relates to stationary equipment, and includes a bulky and heavy pump, which cannot be carried during use, but must be pulled along the floor behind the user of the cutting tool. In addition, the water supply is the regular water tap at the work site, so the pump must be connected by a flexible hose to the tap. Finally, mud formed by the wet dust tends to clog the water jets. Since the water is under relatively low pressure, the water exits as a spray of relatively large drops, and mud tends to build up at the jet outlet, until the outlet is completely clogged.

Thus, there is a long felt need for a portable, easily carried, light weight device for suppressing dust during cutting with a hand tool, and it would be desirable to have a hand held groove cutter and angle grinder with portable apparatus for suppressing dust.

SUMMARY OF THE INVENTION

According to the present invention, there is provided a hand held cutting tool coupled to a portable device for producing a fog-like spray of water droplets near the cutting tool for moistening dust particles generated during cutting.

According to a preferred embodiment of the invention, the cutting tool includes a rotating blade, a blade guard partially covering the blade, a portable source of pressurized water which can be carried on the body of a user holding the cutting tool, and at least one nozzle mounted in the blade guard and coupled to the pump for producing a fog-like spray of water droplets.

According to a preferred embodiment of the invention, the nozzle is a self-cleaning nozzle.

There is also provided in accordance with the invention a hand held groove cutting tool including a pair of rotating blades mounted on an axle, a blade guard partially covering both blades, a portable source of pressurized water which can be carried on the body of a user holding the cutting tool, and at least one nozzle mounted in the blade guard and coupled to the pump for producing a fog-like spray of water droplets.

There is further provided in accordance with the present invention an attachment for a hand cutting tool having at least one rotating blade, the attachment including a portable device attachable to the hand cutting tool for producing a fog-like spray of water droplets near the rotating blade for moistening dust particles generated during cutting.

According to a preferred embodiment, the attachment includes a blade guard arranged to partially cover the rotating blade, a portable source of pressurized water which can be carried on the body of a user holding the cutting tool, and at least one nozzle mounted in the blade guard and coupled to the source of pressurized water for producing a fog-like spray of water droplets.

There is also provided in accordance with the invention a method of reducing dust adjacent a hand held cutting tool including the steps of coupling the cutting tool having a rotating blade to a portable source of pressurized water, mounting the portable water source on the body of a worker holding the cutting tool, cutting with the cutting tool, and simultaneously spraying a fog-like spray of water droplets from the water source through a nozzle adjacent the rotating blade so as to moisten dust particles generated during cutting.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a portable device for reducing dust generated by hand held cutting tools. In particular, the invention is described with reference to a cement groove cutter, and to angle grinders, for which it is particularly suitable, although any other hand held cutting tool with a rotating blade or disc can be utilized in the invention.

Figure 1:
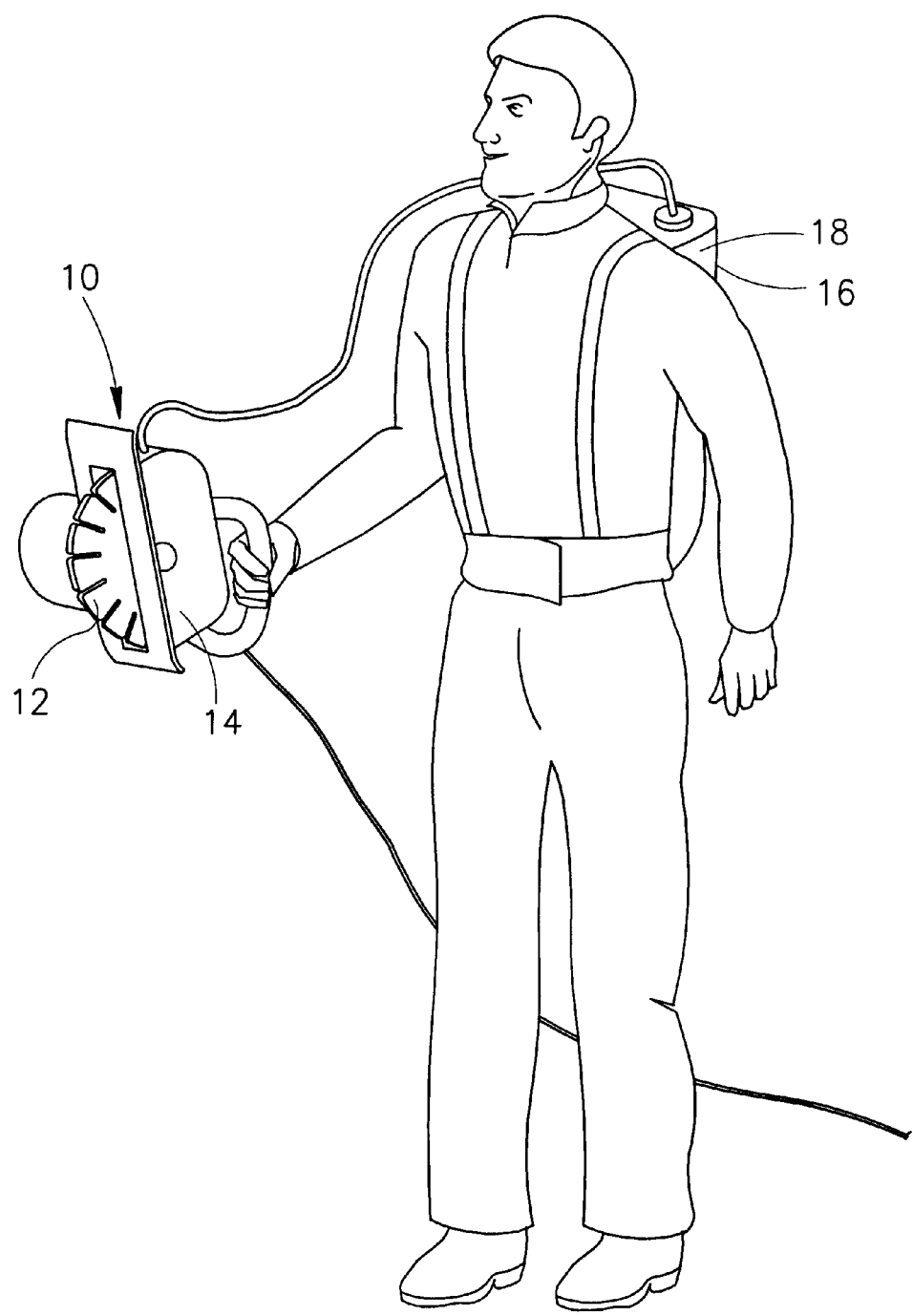
FIG. 1 is a schematic illustration of a hand held cutting tool constructed and operative in accordance with one embodiment of the invention in use.

Referring now to FIG. 1, there is shown a schematic illustration of a hand held cutting tool 10 constructed and operative in accordance with one embodiment of the invention in use. Cutting tool 10 includes a cutting blade 12 mounted in a hand held blade guard 14. Coupled to the interior of blade guard 14 are a number of spray nozzles (not shown) aimed adjacent cutting blade 12. A portable source 16 of pressurized water is coupled to the spray nozzles. According to one embodiment of the invention, the source 16 of pressurized water includes a small water container coupled to a pressurizing pump, mounted in an electrical box 18, which also includes an earth leakage switch, or residual current device (RCD).

It is a particular feature of the invention that the entire apparatus can easily be carried by a person working with the cutting tool. The hand held tool itself is carried in the hand, as usual, while the dust reducing apparatus is carried, for example, in a pack, strapped on the back, or over a shoulder. No heavy, complicated equipment is required.

Figure 2:
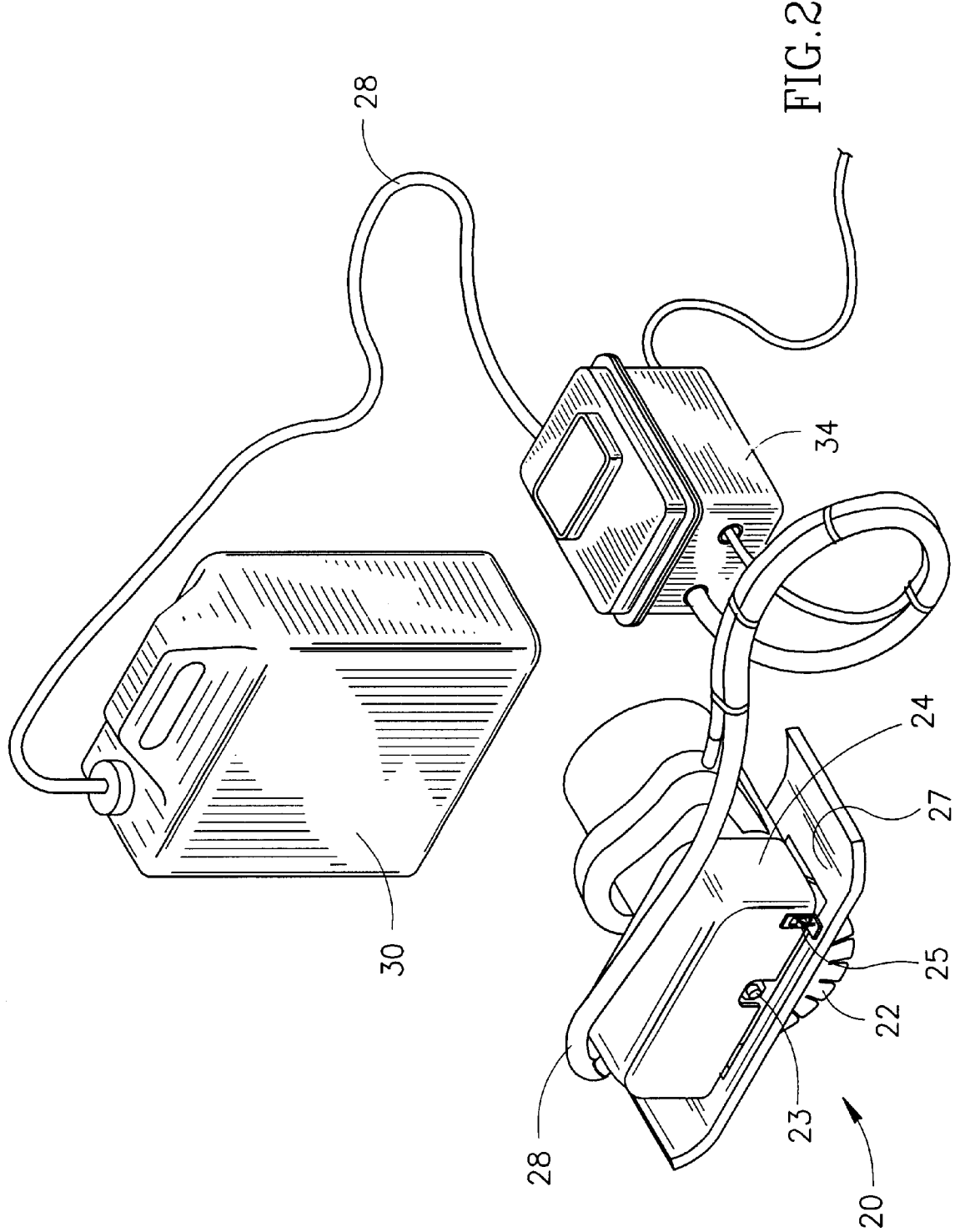
FIG. 2 is a perspective illustration of a hand held groove cutting tool constructed and operative in accordance with one embodiment of the invention.
Figure 3:
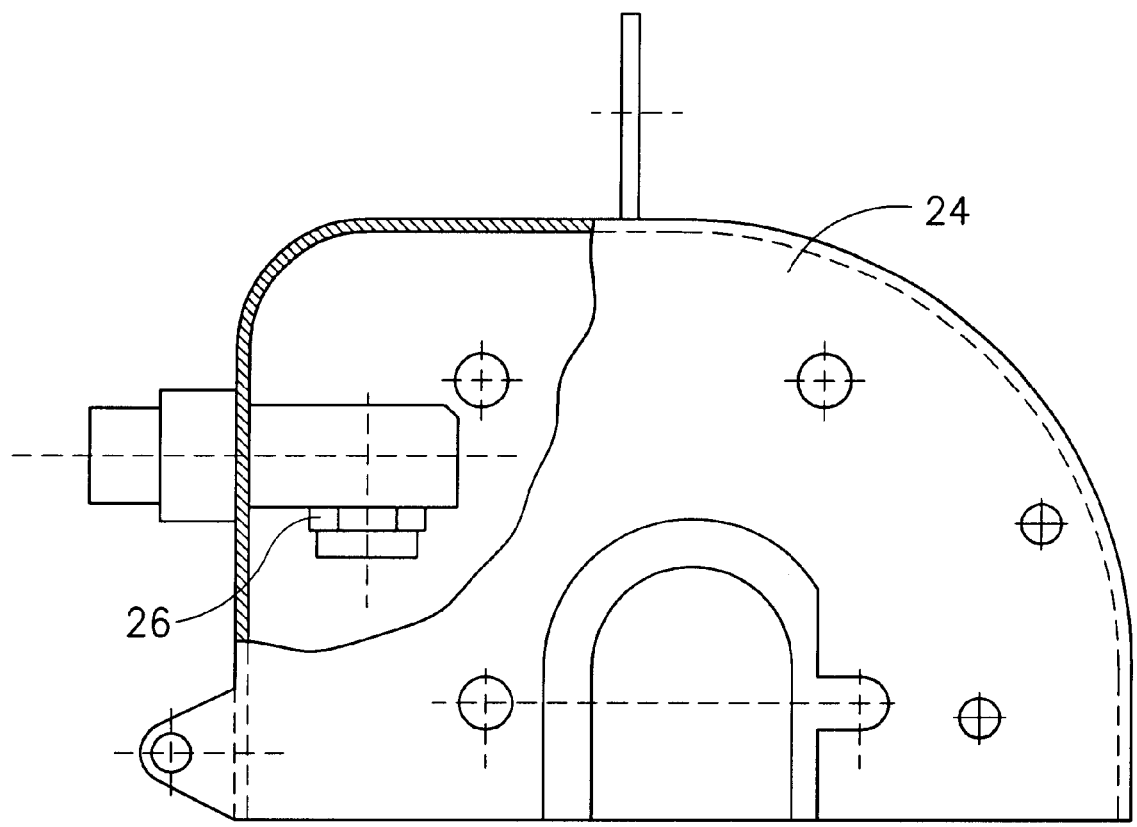
FIG. 3 is a partially cut-away view of a blade guard constructed and operative in accordance with one embodiment of the invention.

Referring now to FIG. 2, there is shown a perspective illustration of a hand held groove cutting tool 20 constructed and operative in accordance with one embodiment of the invention for cutting grooves in concrete, such as for placement of pipes or electric wires. Groove cutter 20 includes two blades 22 mounted in parallel with one another on a single axle 23. A blade guard 24, shown in detail in FIG. 3, covers blades 22 and includes two spray nozzles 26 aimed adjacent blades 22. Preferably, blade guard 24 is fixed to the motor housing of the cutting tool, as by screws. In the illustrated embodiment, the base 27 on which the groove cutter slides while cutting, and which sets the depth of the groove, can easily be lowered to enable cleaning of blade guard 24.

It is a particular feature of the illustrated embodiment of the invention that a light weight, compact pump 32 is provided to provide a pressurized water flow to spray nozzles 26. Spray nozzles 26 are coupled to a light weight, small sized water supply 30, here shown as a plastic container, by flexible pipes 28. The vacuum produced by pump 32 draws water out of water supply 30 through pipes 28 to spray nozzles 26. Spray nozzles 26 provide a fog-like spray of fine droplets of water, which serve to moisten dust particles generated during cutting and carry them down to the bottom of the machine, or onto the floor. The optimum size of the droplets will vary depending on the particular type of cutting tool utilized, the size of its blade, and the volume of the blade guard.

The pressure given by pump 32 is selected in accordance with the particular cutting tool, the size of the spray nozzles, and the size of the blade. In the present example, a pressure of about 2.6 Barr is preferred, for a two disc concrete groove cutter with spray nozzles having a diameter of about 0.51 mm.

Figure 4:
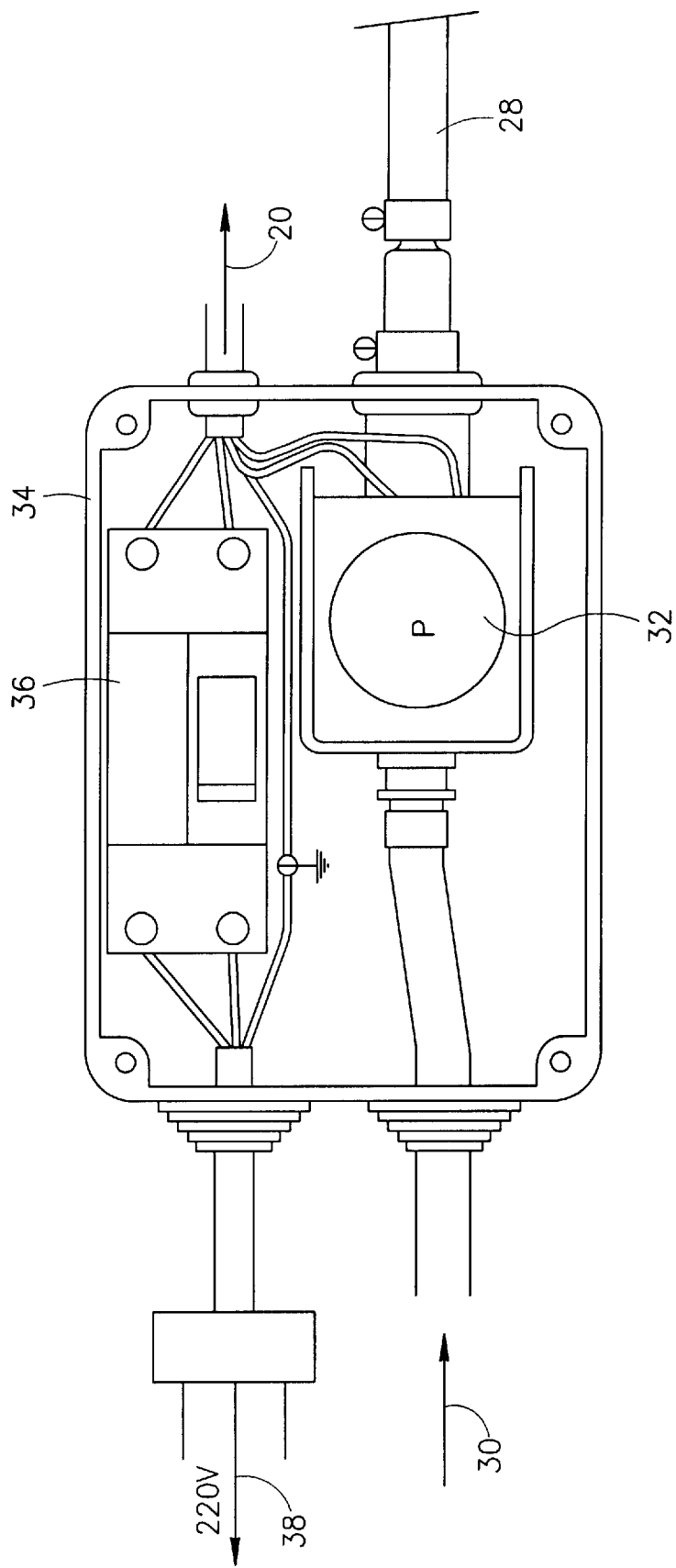
FIG. 4 is a schematic sectional view of an electrical box constructed and operative in accordance with one embodiment of the invention.

According to a preferred embodiment, water pump 32 is mounted inside electrical box 34, shown in sectional view in FIG. 4. In this way, a compact, light weight spraying device is provided which can be carried on the body of a worker holding the cutting tool. Also in electrical box 34 is an earth leakage switch 36, or residual current device, which serves to prevent electrocution. Earth leakage switch 36 is coupled on one side to a voltage source 38, and coupled on the other side to groove cutter 20. While this configuration, with both water pump and earth leakage switch in a single box, is preferred, so as to provide a convenient source of electricity for water pump 32 and to minimize the number of elements in the system, alternatively, the water pump and earth leakage switch can be carried separately.

Operation of the present invention is as follows. The rotating blade of a hand held cutting tool is partially covered by a blade guard having at least one, preferably two, and possible more, spray nozzles aimed adjacent the blade. A source of pressurized water, for example a water container coupled to a pump, is coupled to the spray nozzles and strapped to a worker holding the cutting tool. The cutting tool is activated, and begins cutting, for example, cutting two parallel grooves in a cement wall to make a wide groove for receiving pipes. As the cutting tool cuts, dust is generated. The spray nozzles spray a fog of tiny water droplets adjacent the rotating blades, which serve to moisten the dust, turning it into a paste which drips down the wall or the machine.

It is a particular feature of the invention that the spray nozzles are effectively self-cleaning. Due to the relatively high pressure produced by the pump, a fog-like spray is created which, due to the water pressure and the angle of distribution, prevents the build up of mud around the nozzle outlets. Furthermore, due to the low water flow needed to create the fog, a relatively small water tank (i.e., 4 liters) can suffice for quite long periods of work.

Figure 5A:
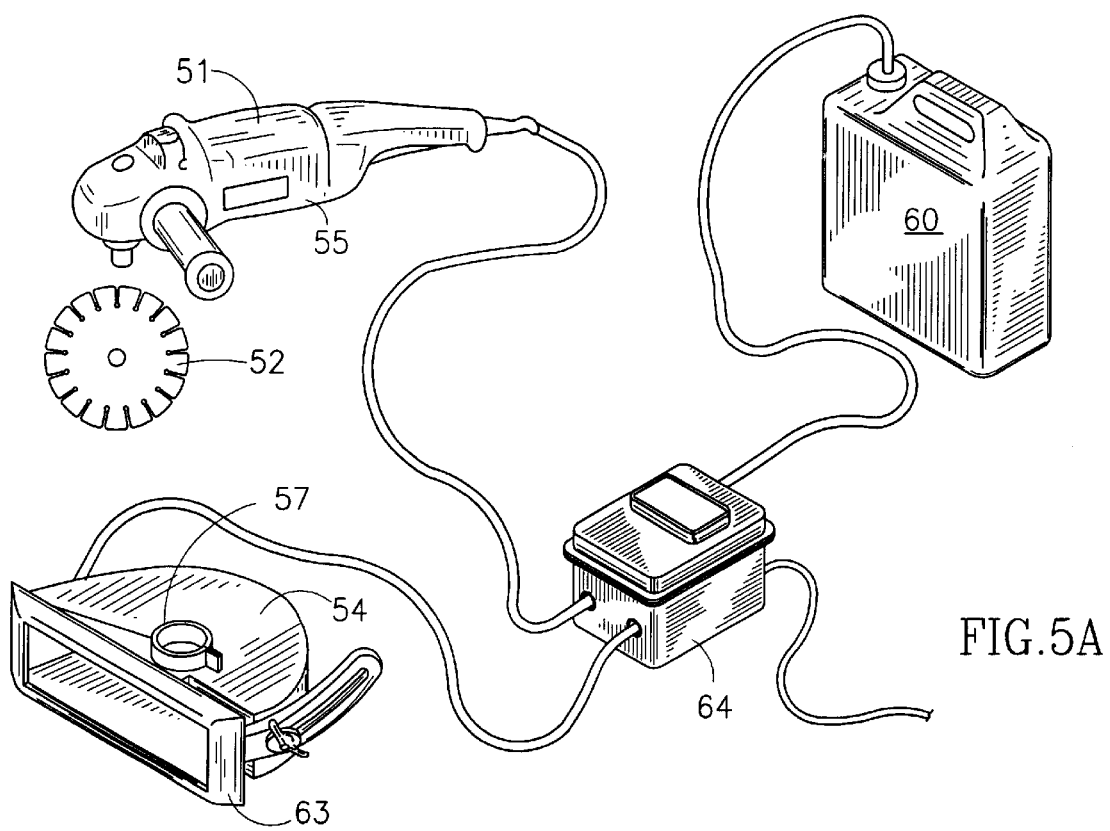
FIGS. 5a and 5b are perspective illustrations of an attachment for a hand held cutting tool, constructed and operative in accordance with another embodiment of the invention.
Figure 5B:
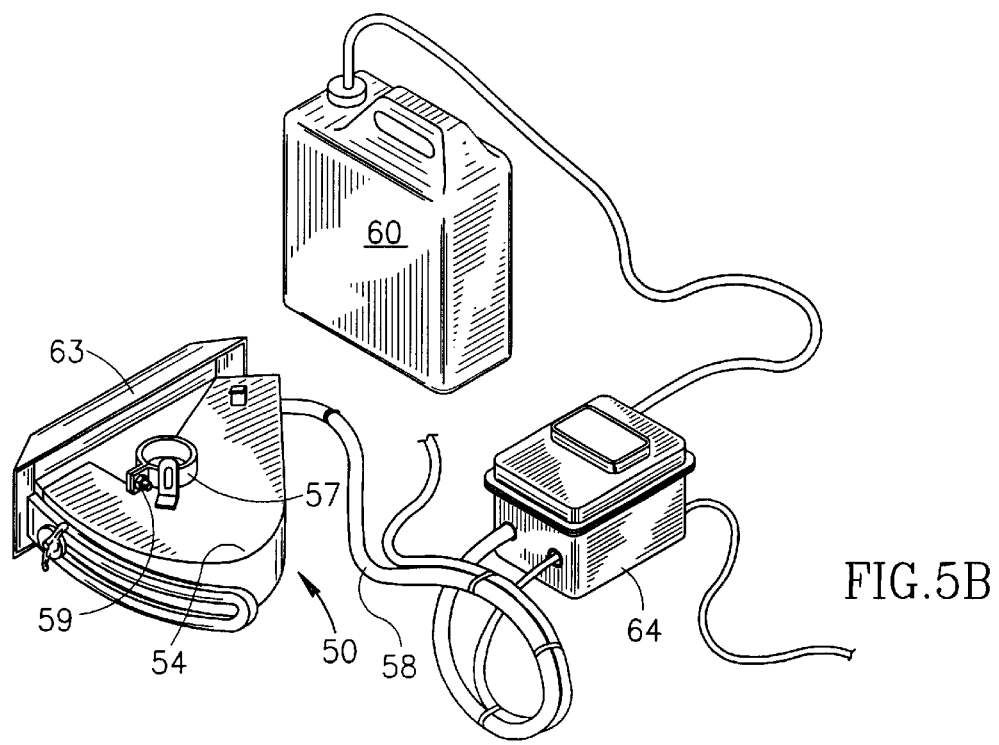

Referring now to FIGS. 5a and 5b, there shown perspective illustrations of an attachment 50 for a hand held cutting tool, constructed and operative in accordance with another embodiment of the invention, here illustrated as an angle grinder 51. Attachment 50 includes a blade guard 54, arranged to cover a cutting wheel 52 of angle grinder 51, and includes spray nozzles as described above (not shown) aimed adjacent cutting wheel 52. Blade guard 54 is arranged to be removably affixed to the motor housing 55 of the cutting tool, as by a collar 57 and bolt 59, and cutting wheel 52 is screwed to the motor housing 55 through the blade guard 54.

The arrangement of the spray nozzles and water supply is substantially as described above with reference to FIG. 2. A light weight, compact pump 62 is provided in electrical box 64 to provide a pressurized water flow to the spray nozzles. The spray nozzles are coupled to a light weight, small sized water supply 60, here shown as a plastic container, by flexible pipes 58. The vacuum produced by pump 62 draws water out of water supply 60 through pipes 58 to the spray nozzles. The spray nozzles provide a fog-like spray of fine droplets of water, which serve to moisten dust particles generated during cutting and carry them down to the bottom of the machine, or onto the floor.

According to this embodiment, a cover member 63 is provided on blade guard 54. Cover member 63 serves to create a closed chamber with the surface to be cut, thereby creating a sufficient density of fog to efficiently entrap the dust created during cutting.

It is a particular feature of this embodiment of the invention that it can be adapted to fit any hand held tool having a rotating blade or blades, by adapting the size of collar 57 of the blade guard. While it has been illustrated here with reference to an angle grinder, it will be appreciated that the invention can be adapted for any other similar hand held tool.

Figure 6:
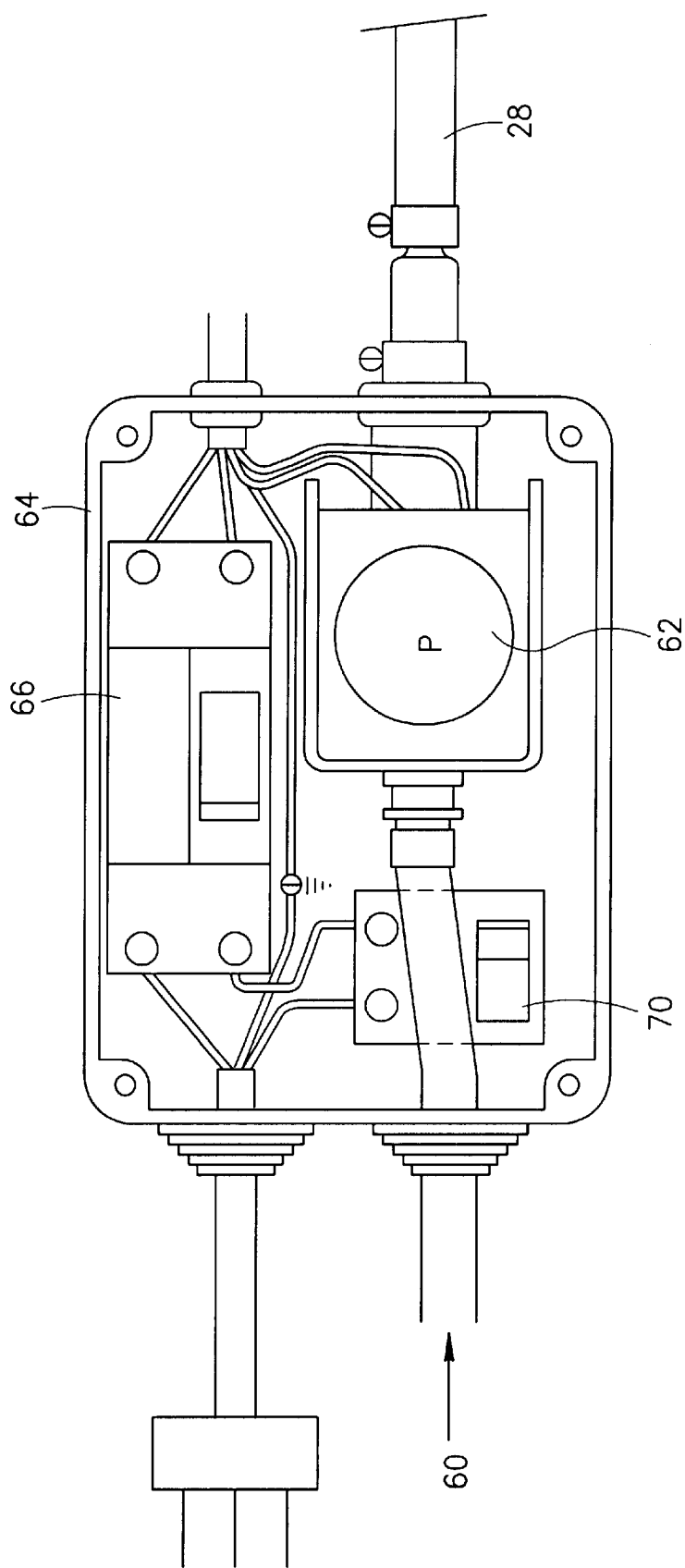
FIG. 6 is a schematic sectional view of an electrical box constructed and operative in accordance with another embodiment of the invention.

According to an another preferred embodiment of the invention, water pump 62 is mounted inside electrical box 64, as shown in sectional view in FIG. 6. Electrical box 64 includes a further safety element, namely an automatic switch 70 to control the flow of water. In the event that the cutting tool is turned off, automatic switch 70 senses the cut off of current in the line, and cuts off power to the pump, thereby cutting off the flow of water. This prevents the electric motor of the cutting tool from being soaked with water when it is not operating, a situation which easily occurs in conventional tools having associated water flow. Also in electrical box 64 is an earth leakage switch 66, or residual current device, which serves to prevent electrocution. Earth leakage switch 66 is coupled on one side to a voltage source 68, and coupled on the other side to angle grinder 50. While this configuration, with both water pump and earth leakage switch in a single box, is preferred, so as to provide a convenient source of electricity for water pump 62 and to minimize the number of elements in the system, alternatively, the water pump and earth leakage switch can be carried separately.

It will be appreciated that the invention is not limited to what has been described herein above merely by way of example. Rather, the invention is limited solely by the claims which follow.

What is claimed is:

1. A hand held cutting tool including an abrasive blade, the tool being coupled to a portable source of pressurized water, which can be carried on the body of a user holding the cutting tool, the source of pressurized water including a portable water container, and a lightweight, compact, pressurizing pump coupled to the portable water container, and a nozzle coupled to the source of pressurized water for spraying a fog of tiny water droplets near the blade of the cutting tool for moistening dust particles generated during cutting.

2. The cutting tool as claimed in claim 1, wherein the cutting tool comprises:
    a rotating abrasive blade; and
    a blade guard partially covering said abrasive blade;
    the nozzle being mounted in said blade guard.

3. The cutting tool as claimed in claim 1, wherein said hand held cutting tool is a concrete groove cutter.

4. The cutting tool as claimed in claim 1, wherein said cutting tool is an angle grinder.

5. The cutting tool according to claim 1, further comprising an earth leakage switch.

6. An attachment for a hand cutting tool having at least one rotating abrasive blade, the attachment comprising:
    a portable source of pressurized water which can be carried on a body of a user holding the cutting tool,
    the source of pressurized water being attachable to the hand cutting tool,
    a nozzle coupled to the source of pressurized water for spraying a fog of tiny water droplets near the rotating abrasive blade for moistening dust particles generated during cutting;
    an electrical box;
    a water pump mounted inside said electrical box for providing pressurized water; an automatic flow control switch mounted inside said electrical box; and
    an earth leakage switch to prevent electrocution mounted inside said electrical box.

7. A method of reducing dust adjacent a hand held cutting tool having a rotating abrasive blade comprising the steps of:
    coupling the cutting tool to a portable source of pressurized water;
    mounting said portable water source on a body of a worker holding the cutting tool;
    cutting with the cutting tool; and
    simultaneously spraying a fog of tiny water droplets from said water source through at least one spray nozzle adjacent said rotating abrasive blade so as to moisten dust particles generated during cutting.

8. The method as claimed in claim 7, wherein said step of coupling includes:
    coupling a light weight, compact, pressurizing pump to said portable water container;
    mounting said pump on the body of said worker; and
    coupling an outlet of said pump to said spray nozzles.

9. A hand held cutting tool including an abrasive blade, the tool being coupled to a portable source of pressurized water, which can be carried on the body of a user holding the cutting tool, a nozzle coupled to the source of pressurized water for spraying a fog of tiny water droplets near the blade of the cutting tool for moistening dust particles generated during cutting, and an automatic flow control switch for stopping a flow of water from the portable source of pressurized water when the cutting tool is not operating.

* * * * *